US010092978B2

(12) United States Patent
Tokito (10) Patent No.: US 10,092,978 B2
(45) Date of Patent: Oct. 9, 2018

(54) LASER PROCESSING APPARATUS CAPABLE OF RETRACTING PROCESSING NOZZLE UPON POWER FAILURE

(71) Applicant: FANUC CORPORATION, Minamitsuru-gun, Yamanashi (JP)

(72) Inventor: Hiroaki Tokito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 185 days.

(21) Appl. No.: 14/665,509

(22) Filed: Mar. 23, 2015

(65) Prior Publication Data
US 2015/0273626 A1 Oct. 1, 2015

(30) Foreign Application Priority Data
Mar. 25, 2014 (JP) ................... 2014-061817

(51) Int. Cl.
B23K 26/00 (2014.01)
B23K 26/02 (2014.01)
B23K 26/08 (2014.01)
B23K 26/04 (2014.01)
B23K 26/044 (2014.01)

(52) U.S. Cl.
CPC ........ B23K 26/0892 (2013.01); B23K 26/043 (2013.01); B23K 26/044 (2015.10)

(58) Field of Classification Search
CPC .......................... B23K 26/043; B23K 26/044; B23K 26/0892; B23K 26/048; B23K 26/0884; B23K 26/0869; B23K 26/00; B23K 26/02
USPC ... 219/121.6, 69.16, 121.82, 124.02, 121.65, 219/121.67, 121.73, 121.78
See application file for complete search history.

(56) References Cited

U.S. PATENT DOCUMENTS

2003/0183608 A1* 10/2003 Yamazaki .......... B23K 26/0853
219/121.83
2009/0082900 A1* 3/2009 Akaiwa .............. G05B 19/4097
700/178

FOREIGN PATENT DOCUMENTS

CN 201134018 Y 10/2008
CN 101393448 A 3/2009
(Continued)

OTHER PUBLICATIONS

Japanese Office Action dated Aug. 11, 2015 for Japanese Application No. 2014-061817, including English translation.
(Continued)

Primary Examiner — Michael G Hoang
(74) Attorney, Agent, or Firm — RatnerPrestia (57) ABSTRACT

A laser processing apparatus including a processing nozzle for irradiating a workpiece with laser beam, a driving mechanism for relatively moving the processing nozzle and the workpiece, and a gap sensor for detecting a gap between the processing nozzle and the workpiece. The apparatus includes a gap control section referring to a measured value detected by the gap sensor and calculating a manipulating variable used for controlling the driving mechanism so as to maintain the gap during execution of laser processing at a first dimension, a power monitoring section monitoring electric power from a power supply and sending an abnormality detection signal to the gap control section when a power abnormality occurs, and a control action switching section switching a control action of the gap control section so as to increase the gap from the first dimension when the abnormality detection signal is sent to the gap control section.

1 Claim, 4 Drawing Sheets

(56) References Cited

FOREIGN PATENT DOCUMENTS

| CN | 101693320 A | 4/2010 |
|---|---|---|
| CN | 102205462 A | 10/2011 |
| DE | 102008046830 A1 | 4/2009 |
| EP | 1348511 A1 | 10/2003 |
| JP | 62109888 | 7/1987 |
| JP | 63184684 | 11/1988 |
| JP | 03086386 | 1/1991 |
| JP | H 03-044388 Y | 9/1991 |
| JP | 06170574 | 6/1994 |
| JP | 2751766 B | 2/1998 |

OTHER PUBLICATIONS

Chinese Office Action for Application No. 201510106991.6, dated Dec. 13, 2016, 6 pages.
German Office Action for German Application No. 10 2015 003 496.0, dated Mar. 22, 2017—11 Pages.

\* cited by examiner

LASER PROCESSING APPARATUS CAPABLE OF RETRACTING PROCESSING NOZZLE UPON POWER FAILURE

BACKGROUND OF THE INVENTION

1. Field of the Invention

The present invention relates to a laser processing apparatus.

2. Description of the Related Art

In a laser processing apparatus equipped with a processing nozzle that projects laser beam on a workpiece, it is known to make provisions so that the processing nozzle and the workpiece are moved relative to each other by performing a gap control in order to maintain a constant spacing (hereinafter referred to as a "gap") between the tip of the processing nozzle and the surface of the workpiece during execution of laser processing such as cutting on the workpiece. If, for example, a power failure such as a power outage or voltage drop occurs when performing laser processing under gap control, there is a danger that the processing nozzle may accidentally hit the workpiece due to such causes as a malfunction of a gap sensor or a delay in the activation of a safety brake.

Various laser processing apparatus capable of preventing the processing nozzle from accidentally hitting the workpiece have been proposed in the prior art. For example, Japanese Examined Utility Model Publication No. H03-44388 (JP H03-044388 Y) discloses a laser processing apparatus equipped with a processing head dropping prevention mechanism which, upon cutoff of power to a driving device for moving the processing head up and down, actuates a spring-biased engaging member to stop the rotation of a ball screw being driven by the driving device.

On the other hand, Japanese Patent No. 2751766 (JP 2751766 B) discloses a laser processing apparatus equipped with a mechanism for positioning the processing head and preventing it from slipping down by causing a stopper provided on a movable part to which the processing head is attached and a stopper provided on a fixed part having a processing head guide to abut against each other. One or the other of the stoppers provided on the movable part and the fixed part is adapted to be able to change the position at which it abuts against the other stopper.

SUMMARY OF THE INVENTION

The gap dimension to be maintained during laser processing is, for example, about a few millimeters, though it varies depending on the processing and other conditions. When a power failure occurs while maintaining such a small gap, the prior art method that forcibly stops the movement of the processing nozzle by mechanical means in order to prevent it from hitting the workpiece may not be able to prevent the hitting in a reliable manner. It is therefore desired that provisions be made to be able to automatically increase the gap when a power failure occurs during execution of laser processing.

One aspect of the present invention provides a laser processing apparatus comprising a processing nozzle configured to irradiate a workpiece with laser beam; a driving mechanism configured to move the processing nozzle and the workpiece relative to each other; a gap sensor configured to detect a gap between the processing nozzle and the workpiece; a gap control section configured to refer to a measured value detected by the gap sensor and calculate a manipulating variable used for controlling the driving mechanism so as to maintain the gap during execution of laser processing at a first dimension; a power monitoring section configured to monitor electric power supplied from a power supply and send an abnormality detection signal to the gap control section when an abnormality occurs in the electric power; and a control action switching section configured to switch a control action of the gap control section so as to increase the gap from the first dimension when the abnormality detection signal is sent to the gap control section during execution of laser processing.

In the laser processing apparatus according to the above aspect, when a power failure such as a power outage or voltage drop occurs, the control action switching section quickly responds to the abnormality detection signal output from the power monitoring section and switches the control action of the gap control section, so that it is possible to increase the gap from the first dimension determined for laser processing to a desired dimension, which is performed as a part of a gap control. When increasing the gap to a dimension larger than the first dimension determined for laser processing, it is possible to prevent the processing nozzle in a reliable manner from accidentally hitting the workpiece. There is no need to provide an additional mechanism for forcibly effecting stoppage, as employed in the conventional technique in which the movement of the processing nozzle is forcibly stopped by mechanical means to prevent it from hitting the workpiece.

BRIEF DESCRIPTION OF THE DRAWINGS

The objects, features and advantages of the present invention will become more apparent from the following description of the embodiments in connection with the accompanying drawings, wherein.

DETAILED DESCRIPTION

Embodiments of the present invention will be described below with reference to the accompanying drawings.

Figure 1:
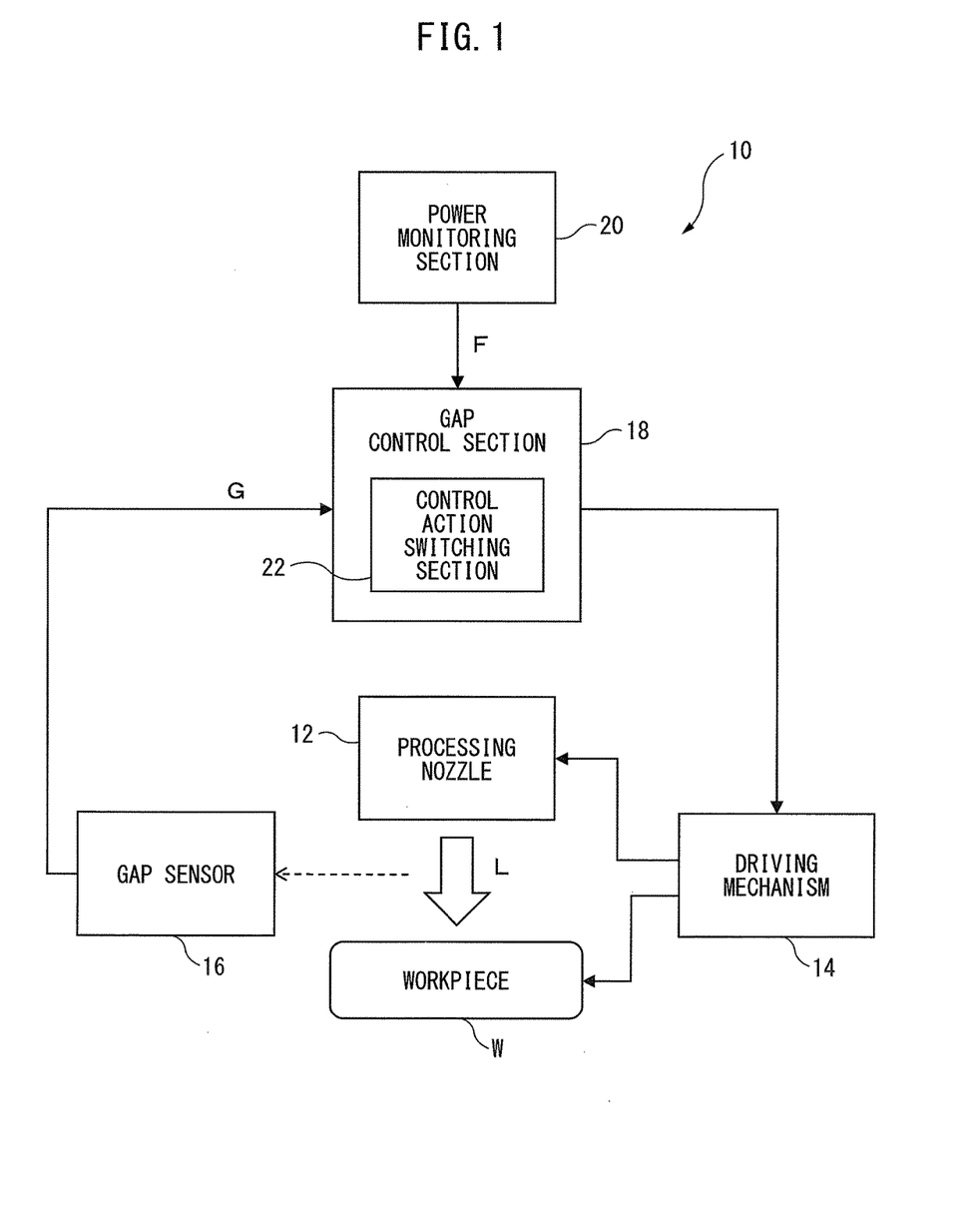
FIG. 1 is a functional block diagram showing the basic configuration of a laser processing apparatus.

FIG. 1 shows the basic configuration of a laser processing apparatus 10 according to one aspect of the present invention. The laser processing apparatus 10 includes a processing nozzle 12 configured to irradiate a workpiece W with laser beam L, a driving mechanism 14 configured to move the processing nozzle 12 and the workpiece W relative to each other, a gap sensor 16 configured to detect a gap between the processing nozzle 12 and the workpiece W, and a gap control section 18 configured to refer to a measured value G detected by the gap sensor 18 and calculate a manipulating variable used for controlling the driving mechanism 14 so as to maintain the gap during execution of laser processing at a target (or reference) value.

The laser processing apparatus 10 is equipped with a processing head (not shown) containing an optical element for introducing the laser beam L emitted from a laser oscillator (not shown) into a prescribed beam path for focusing, and the processing nozzle 12 is attached to the tip of the processing head. The processing nozzle 12 can project the laser beam L on the workpiece W at a desired focal distance, and can apply an assist gas supplied from an assist gas supply source (not shown) over the workpiece W.

The driving mechanism 14 includes a mechanism for selectively moving the processing nozzle 12 and the workpiece W toward or away from each other. The driving mechanism 14 further includes a mechanism for moving the processing nozzle 12 and the workpiece W relative to each other in a direction along the workpiece surface. For example, the driving mechanism 14 can move the processing nozzle 12 and the workpiece W relative to each other in a three-dimensional fashion with three control axes (X-axis, Y-axis and Z-axis) operating in accordance with command values defined in an orthogonal three-axis coordinate system. In this case, the driving mechanism 14 may include a servo motor and a power transmitting mechanism for each control axis. The control axes may be set for either one or both of the processing nozzle 12 and the workpiece W. For example, the control axes may be configured so that the processing head (not shown) equipped with the processing nozzle 12 is driven by the Z axis to move the head in a direction perpendicular to the workpiece W and so that a work table (not shown) with the workpiece W fixed thereon is driven by the X and Y axes to move the worktable in horizontal directions relative to the processing nozzle 12.

The gap sensor 16 is constructed, for example, from a noncontact displacement sensor, and measures the shortest distance (i.e., the gap) maintained between the tip of the processing nozzle 12 and the surface to be machined of the workpiece W. The gap sensor 16 continuously measures the gap dimension while the laser processing apparatus 10 is performing laser processing such as cutting on the workpiece W, and sends the measured value G, as real-time feedback information, to the gap control section 18.

The gap control section 18 is implemented as one of the functions of a control apparatus (not shown) such as a numerical control apparatus. While the laser processing apparatus 10 is performing laser processing such as cutting on the workpiece W, the gap control section 18 continuously refers to the measured value G output from the gap sensor 16 and calculates the manipulating variable used for controlling the driving mechanism 14 so as to maintain the gap at a predetermined target value. The target value for the gap to be maintained during the execution of laser processing is hereinafter referred to as a "first dimension". While the laser processing apparatus 10 is performing laser processing such as cutting on the workpiece W, the control apparatus incorporating the gap control section 18 generates a command corresponding to the manipulating variable calculated by the gap control section 18 (i.e., the manipulating variable for maintaining the gap at the first dimension) and sends the command to the driving mechanism 14. The driving mechanism 14 that received the command moves the processing nozzle 12 and the workpiece W toward or away from each other to maintain the gap at the first dimension. The control performed based on the manipulating variable calculated by the gap control section 18 is hereinafter referred to as a "gap control".

The laser processing apparatus 10 may include, as supplemental component elements, a Z-axis position sensor configured to detect the operating position of a control axis (hereinafter referred to as a Z axis) for selectively moving the processing nozzle 12 and the workpiece W toward or away from each other, and a Z-axis position control section configured to refer to the detection value of the Z-axis position sensor and calculate the manipulating variable used for controlling the driving mechanism 14 so as to maintain the Z-axis position of the processing nozzle 12 relative to the workpiece W at a target value. In response to a command corresponding to the manipulating variable calculated by the Z-axis position control section, the driving mechanism 14 can move the processing nozzle 12, for example, from a prescribed retracted position to a workpiece processing start position, or from a workpiece processing completed position back to the prescribed retracted position.

The laser processing apparatus 10 may further include, as supplemental component elements, an X-axis position sensor and a Y-axis position sensor, which detect the operating positions of respective control axes (hereinafter referred to as X axis and Y axis) for moving the processing nozzle 12 and the workpiece W relative to each other in directions along the workpiece surface, and an X-axis position control section and a Y-axis position control section, each of which refers to the detection value of the X-axis position sensor or Y-axis position sensor and calculates the manipulating variable for controlling the driving mechanism 14 so as to maintain the X-axis position or Y-axis position of the processing nozzle 12 relative to the workpiece W at a target value, respectively. In response to commands corresponding to the manipulating variables calculated by the X-axis position control section and Y-axis position control section, respectively, the driving mechanism 14 can move the processing nozzle 12 relative to the workpiece W, for example, from the workpiece processing start position to the workpiece processing completed position along a prescribed processing path. By performing the Z-axis gap control simultaneously with the X-axis and Y-axis position control, the laser processing apparatus 10 can perform prescribed laser processing on the workpiece W.

Referring back to FIG. 1, the laser processing apparatus 10 further comprises a power monitoring section 20 configured to monitor electric power supplied from a power supply to the laser processing apparatus 10 and send an abnormality detection signal F to the gap control section 18 when an abnormality occurs in the electric power, and a control action switching section 22 configured to switch the control action of the gap control section 18 so as to increase the gap from the first dimension when the abnormality detection signal F is sent to the gap control section 18 during execution of laser processing.

The power monitoring section 20 is constructed from an electronic circuit such as an IC provided in a power supply unit (not shown) of the laser processing apparatus 10. The power monitoring section 20 constantly monitors the power being supplied from a commercial power supply via the power supply unit to the laser processing apparatus 10, and outputs the abnormality detection signal F upon occurrence of a power failure such as a power outage or voltage drop.

The control action switching section 22 is implemented as one of the functions of the control apparatus (not shown) such as a numerical control apparatus. The control action switching section 22 is also one of the functions incorporated in the gap control section 18 and, when receiving the abnormality detection signal F from the power monitoring section 20, operates to change a manipulating variable calculation operation executed by the gap control section 18, from a calculation operation to be performed during execution of laser processing to calculation operation to be performed in the event of abnormality detection (i.e., operates to switch the control action). When the abnormality detection signal F is received from the power monitoring section 20, the gap control section 18 switches to the calculation operation to be performed in the event of abnormality detection, and calculates the manipulating variable used for controlling the driving mechanism 14 so as to maintain the gap at the target value. In response to a command corresponding to the manipulating variable obtained by the calculation operation performed in the event of abnormality detection, the driving mechanism 14 moves the processing nozzle 12 and the workpiece W away from each other thereby increasing the gap to a suitable dimension larger than the first dimension.

The laser processing apparatus 10 may further include, as a supplemental component element, a power storage unit which stores power supplied from the commercial power supply via the power supply unit to the laser processing apparatus 10 under normal operation. The power storage unit has a predetermined power storage capacity and, in the event of a power failure such as a power outage or voltage drop, the power storage unit is switched in to replace the power supply unit to supply power corresponding to the power storage capacity to the laser processing apparatus 10. In the laser processing apparatus 10, the gap control section 18 performs the prescribed calculation operation upon detection of the abnormality and the driving mechanism 14 is driven to increase the gap to a suitable dimension larger than the first dimension before the power from the power storage unit is used up.

Generally, when the laser processing apparatus is performing a gap control, it is difficult to increase the gap because the gap control section operates to maintain the gap at the target value. One possible method to address this difficulty is to cause the control apparatus to switch the gap control to the Z-axis position control and perform the calculation operation for increasing the gap upon occurrence of a power failure such as a power outage or voltage drop. However, since it takes time to perform the calculation operation by switching the gap control to the Z-axis position control, there is a concern that, depending on the power storage capacity of the power storage unit, the power may be used up before the result of the calculation can be obtained, resulting in a situation where the gap cannot be increased.

By contrast, according to the laser processing apparatus 10 having the above-described configuration, when a power failure such as a power outage or voltage drop occurs, the control action switching section 22 quickly responds to the abnormality detection signal F output from the power monitoring section 20 and switches the control action of the gap control section 18, so that it is possible to increase the gap from the first dimension determined for laser processing to a desired dimension, which is performed as a part of a gap control. Since the switching of the control action of the gap control section 18 can be accomplished in a shorter time than that required to switch from the gap control to the Z-axis position control, the driving mechanism 14 can move the processing nozzle 12 and the workpiece W away from each other and thus increase the gap to the suitable dimension before the power supplied from the power storage unit is used up. When increasing the gap to a dimension larger than the first dimension determined for laser processing, it is possible to prevent the processing nozzle 12 in a reliable manner from accidentally hitting the workpiece W. There is no need to provide an additional mechanism for forcibly effecting stoppage, as employed in the conventional technique in which the movement of the processing nozzle is forcibly stopped by mechanical means to prevent it from hitting the workpiece.

Figure 2:
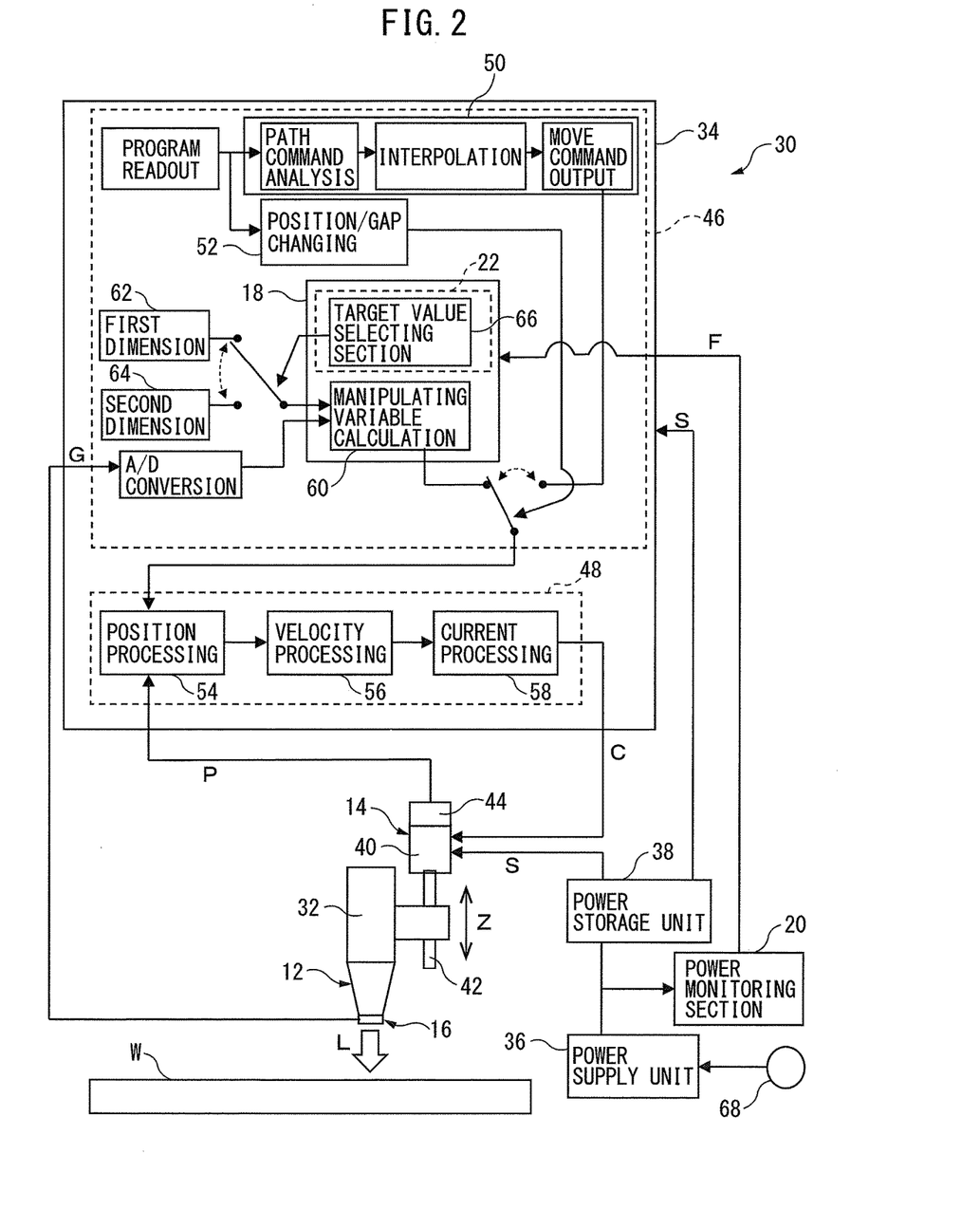
FIG. 2 is a functional block diagram showing the configuration of a laser processing apparatus according to one embodiment.

FIG. 2 shows the configuration of a laser processing apparatus 30 according to one embodiment. The laser processing apparatus 30 includes the basic configuration of the laser processing apparatus 10 described above, and therefore corresponding components are designated by the same reference numerals, and a detailed description thereof is not repeated.

The laser processing apparatus 30 includes a processing nozzle 12, a driving mechanism 14, a gap sensor 16, a gap control section 18, a power monitoring section 20, and a control action switching section 22. The laser processing apparatus 30 further includes a processing head 32 to which the processing nozzle 12 is attached, a control apparatus 34 such as a numerical control apparatus, which incorporates the gap control section 18, a power supply unit 36, and a power storage unit 38. The laser processing apparatus 30 operates in accordance with a processing program which contains processing path commands defined in an orthogonal three-axis coordinate system, and performs laser processing such as cutting on the workpiece W. The processing program also contains a changing command for changing control modes between a Z-axis position control and a gap control.

The driving mechanism 14 includes a Z-axis servo motor 40 and Z-axis power transmitting unit 42 for selectively moving the processing head 32 toward or away from the workpiece W. A Z-axis position sensor (e.g., an encoder) 44 for detecting the operating position of the Z axis is attached to the Z-axis servo motor 40. The driving mechanism 14 further includes an X-axis servo motor, an X-axis power transmitting unit, a Y-axis servo motor and a Y-axis power transmitting unit, which are provide for moving a table (not shown) with the workpiece W fixed thereon in horizontal directions relative to the processing nozzle 12. In FIG. 2, the configuration associated with the X axis and Y axis of the driving mechanism 14 is omitted from illustration.

The gap sensor 16 is attached to the tip of the processing nozzle 12, measures the gap between the tip of the processing nozzle 12 and the surface to be machined of the workpiece W, and sends a measured value G, as real-time feedback information, to the gap control section 18.

The control apparatus 34 includes a Z-axis moving amount calculating section 46 and a Z-axis servo control section 48. The Z-axis moving amount calculating section 46 includes the gap control section 18 and Z-axis position control section 50. The Z-axis position control section 50 reads out the processing program stored, for example, in a memory (not shown) provided in the control apparatus 34, analyzes a Z-axis processing path command contained in the processing program, performs interpolation, and outputs a Z-axis move command (i.e., a manipulating variable of Z-axis position control). The Z-axis moving amount calculating section 46 further includes a changing operation section 52 which operates to change the sections for executing a calculation of moving amount (i.e., manipulating variable), between the gap control section 18 and the Z-axis position control section 50, in accordance with the position control/gap control changing command contained in the processing program.

When moving the processing nozzle 12 from a prescribed retracted position to a workpiece processing start position or from a workpiece processing completed position back to the prescribed retracted position, the changing operation section 52 connects the Z-axis position control section 50 to the Z-axis servo control section 48, and the Z-axis moving amount calculating section 46 then supplies the moving amount (or the manipulating variable) calculated by the Z-axis position control section 50 to the Z-axis servo control section 48. When the processing nozzle 12 reaches the workpiece processing start position, the changing operation section 52 changes the sections executing a calculation of moving amount (i.e., manipulating variable) from the Z-axis position control section 50 to the gap control section 18 in accordance with the changing command contained in the processing program. When moving the processing nozzle 12 relative to the workpiece W from the workpiece processing start position to the workpiece processing completed position along a prescribed processing path, the changing operation section 52 connects the gap control section 18 to the Z-axis servo control section 48, and the Z-axis moving amount calculating section 46 then supplies the moving amount (or the manipulating variable) calculated by the gap control section 18 to the Z-axis servo control section 48. When the processing nozzle 12 reaches the workpiece processing completed position, the changing operation section 52 changes the sections executing a calculation of moving amount (i.e., manipulating variable) from the gap control section 18 to the Z-axis position control section 50 in accordance with the changing command contained in the processing program.

The Z-axis servo control section 48 includes a position processing section 54 which outputs a velocity command by performing a calculation operation on the manipulating variable for the gap control or the manipulating variable for the Z-axis position control, each calculated (as a position command) by the Z-axis moving amount calculating section 46, a velocity processing section 56 which outputs a torque command by performing a calculation operation on the velocity command, and a current processing section 58 which outputs a current command by performing a calculation operation on the torque command. The control apparatus 34 applies the current command, torque command or velocity command, output from the Z-axis servo control section 48, as a Z-axis command value C to the Z-axis servo motor 40 in the driving mechanism 14. The Z-axis position sensor 44 detects the operating position of the Z-axis servo motor 40, and sends a detected value P as feedback information to the position processing section 54.

The control apparatus 34 further includes an X-axis moving amount calculating section, an X-axis servo control section, a Y-axis moving amount calculating section and a Y-axis servo control section. Neither the X-axis moving amount calculating section nor the Y-axis moving amount calculating section includes components corresponding to the gap control section 18 and changing operation section 52, but both includes an X-axis position control section and a Y-axis position control section, respectively, each similar to the Z-axis position control section 50. The X-axis servo control section and the Y-axis servo control section are each identical in configuration to the Z-axis servo control section 48. The control apparatus 34 applies an X-axis command value and a Y-axis command value, output from the X-axis servo control section and the Y-axis servo control section, respectively, to the X-axis servo motor (not shown) and the Y-axis servo motor (not shown), respectively, in the driving mechanism 14. In FIG. 2, the configuration associated with the X axis and Y axis of the control apparatus 34 is omitted from illustration.

The control apparatus 34 may further include supplemental functions (not shown) such as outputting a command for moving a focusing optical system of the processing head 32, a command for controlling or turning on and off the laser output of an laser oscillator (not shown), and a command for controlling or turning on and off the gas pressure of an assist gas supply source (not shown).

The gap control section 18 includes a control action switching section 22 and a manipulating variable calculating section 60 which calculates manipulating variable used for controlling the driving mechanism 14 so as to maintain the gap at a target value. The control action switching section 22 includes a target value selecting section 66 configured to select, as a target value of the gap, either one of a first dimension 62 previously determined as a gap target value to be maintained during laser processing and a second dimension 64 previously determined to be larger than the first dimension 62. The first dimension 62 and the second dimension 64 are stored, for example, in a memory (not shown) provided in the control apparatus 34.

When the laser processing apparatus 30 is performing laser processing such as cutting on the workpiece W, the target value selecting section 66 selects the first dimension 62 as the gap target value. When the laser processing apparatus 30 is performing laser processing such as cutting on the workpiece W, the manipulating variable calculating section 60 calculates the manipulating variable, based on the difference between the first dimension 62 and the measured value G (that is an A/D converted value) received from the gap sensor 16. In this way, the first dimension 62 serves as a standard value by reference to which the manipulating variable calculating section 60 calculates the manipulating variable for performing the gap control. The Z-axis servo control section 48 generates the Z-axis command value C corresponding to the manipulating variable used for the gap control, calculated by the manipulating variable calculating section 60 using the first dimension 62 as the target value, and sends the command value C to the Z-axis servo motor 40. The Z-axis servo motor 40, in response to the Z-axis command value C, operates to move the processing nozzle 12 in the Z-axis direction so as to maintain the gap at the first dimension 62.

The power monitoring section 20 constantly monitors the electric power supplied from a commercial power supply 68 via the power supply unit 36 to the laser processing apparatus 30. When a power failure such as a power outage or voltage drop occurs in the commercial power supply 68, the power monitoring section 20 detects it and promptly outputs an abnormality detection signal F to the gap control section 18. In the event of a power failure, the power storage unit 38 having a predetermined power storage capacity is switched in, to replace the power supply unit 36, and supplies electric power S corresponding to the power storage capacity to the laser processing apparatus 30.

When the abnormality detection signal F output from the power monitoring section 20 is received by the gap control section 18 during a time when the laser processing apparatus 30 is performing laser processing such as cutting on the workpiece W, the target value selecting section 66 selects the second dimension 64 instead of the first dimension 62 as the gap target value. The manipulating variable calculating section 60 calculates the manipulating variable, based on the difference between the second dimension 64 and the measured value G (A/D converted value) received from the gap sensor 16. In other words, when the abnormality detection signal F output from the power monitoring section 20 is received, the gap control section 18 calculates the manipulating variable used for controlling the driving mechanism 14 so as to maintain the gap at the second dimension 64. The Z-axis servo control section 48 generates the Z-axis command value C corresponding to the manipulating variable used for the gap control, calculated by the manipulating variable calculating section 60 using the second dimension 64 as the target value, and sends the command value C to the Z-axis servo motor 40. The Z-axis servo motor 40, in response to the Z-axis command value C, is driven to move (i.e., to retract) the processing nozzle 12 in the Z-axis direction away from the workpiece W so as to maintain the gap at the second dimension 64.

According to the laser processing apparatus 30 having the above-described configuration, when a power failure such as a power outage or voltage drop occurs in the commercial power supply 68, the target value selecting section 66 in the control action switching section 22 quickly responds to the abnormality detection signal F output from the power monitoring section 20 and switches the gap target value from the first dimension 62 to the second dimension 64, so that the gap can be increased from the first dimension 62 to be maintained during laser processing to the second dimension 64 by the control action of the gap control section 18. Since the switching operation of the target value to switch the control action of the gap control section 18 can be accomplished by the target value selecting section 66 just switching the target value from the first dimension 62 to the second dimension 64, and since the manipulating variable calculating section 60 need only perform the same operation as that performed during laser processing, the switching operation can be accomplished in a shorter time than the time required for the changing operation section 52 to effect changing from the gap control section 18 to the Z-axis position control section 50 and for the Z-axis position control section 50 to calculate the Z-axis move command. Therefore, according to the laser processing apparatus 30, the gap can be maintained at the second dimension 64 by driving the Z-axis servo motor 40 to move the processing nozzle 12 in the Z-axis direction away from the workpiece W before the power S supplied from the power storage unit 38 is used up. By maintaining the gap at the second dimension 64 which is larger than the first dimension 62 for laser processing, the processing nozzle 12 can be prevented in a reliable manner from accidentally hitting the workpiece W.

Figure 3:
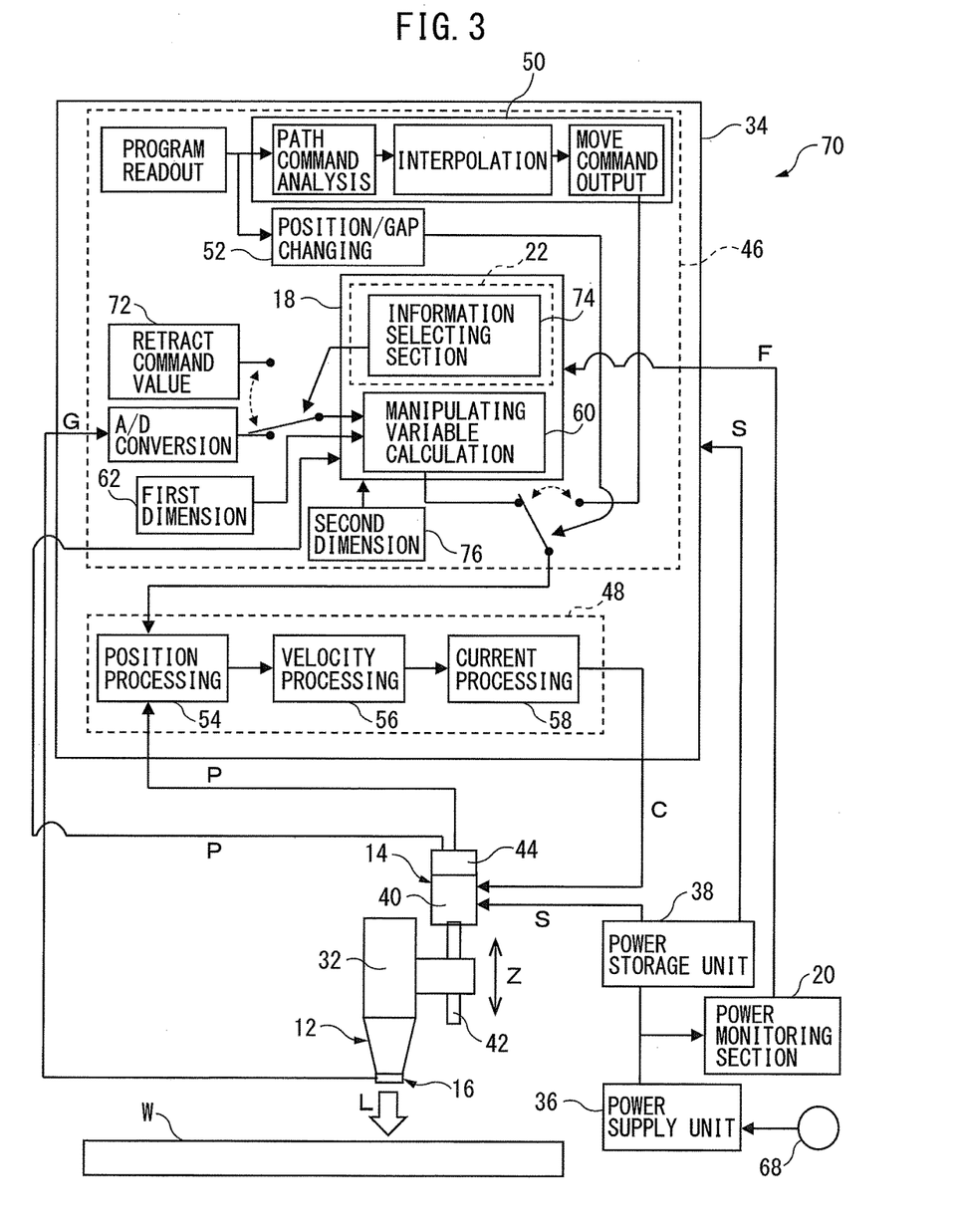
FIG. 3 is a functional block diagram showing the configuration of a laser processing apparatus according to another embodiment.

FIG. 3 shows the configuration of a laser processing apparatus 70 according to another embodiment. The laser processing apparatus 70 includes the basic configuration of the laser processing apparatus 10 earlier described, and therefore corresponding components are designated by the same reference numerals, and a detailed description thereof is not repeated. The laser processing apparatus 70 is substantially identical in configuration to the laser processing apparatus 30 described above, the only difference being the configuration associated with the gap control that the gap control section 18 performs in the event of a power failure, and therefore corresponding components are designated by the same reference numerals, and a detailed description thereof is not repeated.

The laser processing apparatus 70 includes a processing nozzle 12, a driving mechanism 14, a gap sensor 16, a gap control section 18, a power monitoring section 20 and a control action switching section 22. The laser processing apparatus 70 further includes a processing head 32, a control apparatus 34 such as a numerical control apparatus, a power supply unit 36 and a power storage unit 38. The laser processing apparatus 70 operates in accordance with a processing program which contains processing path commands defined in an orthogonal three-axis coordinate system, and performs laser processing such as cutting on the workpiece W.

The driving mechanism 14 includes a Z-axis servo motor 40 and Z-axis power transmitting section 42 for selectively moving the processing head 32 toward or away from the workpiece W. A Z-axis position sensor (e.g., an encoder) 44 for detection the operating position of the Z axis is attached to the Z-axis servo motor 40. In FIG. 3, the configuration associated with the X axis and Y axis of the driving mechanism 14 is omitted from illustration.

The control apparatus 34 includes a Z-axis moving amount calculating section 46 and a Z-axis servo control section 48. The Z-axis moving amount calculating section 46 includes the gap control section 18, a Z-axis position control section 50, and a changing operation section 52. The changing operation section 52 changes the sections for executing a calculation of moving amount (i.e., manipulating variable), between the gap control section 18 and the Z-axis position control section 50, in accordance with the position control/gap control changing command contained in the processing program. The Z-axis servo control section 48 includes a position processing section 54, a velocity processing section 56, and a current processing section 58. The control apparatus 34 applies the current command, torque command or velocity command, output from the Z-axis servo control section 48, as a Z-axis command value C to the Z-axis servo motor 40 in the driving mechanism 14. In FIG. 3, the configuration associated with the X axis and Y axis of the control apparatus 34 is omitted from illustration.

The gap control section 18 includes a control action switching section 22 and a manipulating variable calculating section 60. The control action switching section 22 includes an information selecting section 74 configured to select, as feedback information to be referred to by the gap control section 18, either one of the measured value G detected by the gap sensor 16 and a command value 72 for a nozzle retraction, which is previously determined to be smaller than the first dimension 62. The first dimension 62 and the command value 72 are stored, for example, in a memory (not shown) provided in the control apparatus 34.

When the laser processing apparatus 70 is performing laser processing such as cutting on the workpiece W, the information selecting section 74 selects the measured value G (that is an A/D converted value) from the gap sensor 16 as the feedback information to be referred to by the gap control section 18. When the laser processing apparatus 70 is performing laser processing such as cutting on the workpiece W, the manipulating variable calculating section 60 calculates the manipulating variable, based on the difference between the first dimension 62 previously determined as the target value and the measured value G received from the gap sensor 16. The Z-axis servo control section 48 generates the Z-axis command value C corresponding to the manipulating variable used for the gap control, calculated by the manipulating variable calculating section 60 using the measured value G from the gap sensor 16 as the feedback information, and sends the command value C to the Z-axis servo motor 40. The Z-axis servo motor 40, in response to the Z-axis command value C, operates to move the processing nozzle 12 in the Z-axis direction so as to maintain the gap at the first dimension 62.

The power monitoring section 20 constantly monitors the electric power supplied from the commercial power supply 68 via the power supply unit 36 to the laser processing apparatus 70. When a power failure such as a power outage or voltage drop occurs in the commercial power supply 68, the power monitoring section 20 detects it and promptly outputs an abnormality detection signal F to the gap control section 18. In the event of a power failure, the power storage unit 38 having a predetermined power storage capacity is switched in, to replace the power supply unit 36, and supplies electric power S corresponding to the power storage capacity to the laser processing apparatus 70.

When the abnormality detection signal F output from the power monitoring section 20 is received by the gap control section 18 during a time when the laser processing apparatus 70 is performing laser processing such as cutting on the workpiece W, the information selecting section 74 selects the nozzle retraction command value 72, instead of the measured value G from the gap sensor 16, as the feedback information to be referred to by the gap control section 18. The manipulating variable calculating section 60 calculates the manipulating variable, based on the difference between the first dimension 62 and the command value 72. In other words, when the abnormality detection signal F output from the power monitoring section 20 is received, the gap control section 18 calculates the manipulating variable used for controlling the driving mechanism 14 so as to maintain the gap at the first dimension 62 by referring to the nozzle retraction command value 72 as the feedback information. The Z-axis servo control section 48 generates the Z-axis command value C corresponding to the manipulating variable used for the gap control, calculated by the manipulating variable calculating section 60 using the command value 72 as the feedback information, and sends the command value C to the Z-axis servo motor 40. The Z-axis servo motor 40, in response to the Z-axis command value C, moves the processing nozzle 12 in the Z-axis direction.

Since the nozzle retraction command value 72 is a fixed value smaller than the first dimension 62, if the processing nozzle 12 is moved in the Z-axis direction by the Z-axis servo motor 40, the difference between the first dimension 62 and the command value 72 remains unchanged, and the manipulating variable calculated by the gap control section 18 maintains a constant positive value. This means that the Z-axis servo control section 48 continues to output the Z-axis command value defined in a direction increasing the gap. As a result, the Z-axis servo motor 40, in response to the Z-axis command value C defined in the direction increasing the gap, is driven to move (i.e., to retract) the processing nozzle 12 in the Z-axis direction away from the workpiece W so as to increase the gap from the first dimension 62.

According to the laser processing apparatus 70 having the above-described configuration, when a power failure such as a power outage or voltage drop occurs in the commercial power supply 68, the information selecting section 74 in the control action switching section 22 quickly responds to the abnormality detection signal F output from the power monitoring section 20 and switches the feedback information to be referred to by the gap control section 18 from the measured value G of the gap sensor 16 to the nozzle retraction command value 72, so that the gap can be increased from the first dimension 62 to be maintained during laser processing to a suitable dimension by the control action of the gap control section 18. Since the switching operation of the feedback information to switch the control action of the gap control section 18 can be accomplished by the information selecting section 74 just switching the feedback information from the measured value G to the command value 72, and since the manipulating variable calculating section 60 need only perform the same operation as that performed during laser processing, the switching can be accomplished in a shorter time than the time required for the changing operation section 52 to effect changing from the gap control section 18 to the Z-axis position control section 50 and for the Z-axis position control section 50 to calculate the Z-axis move command. Therefore, according to the laser processing apparatus 70, the gap can be increased to a suitable dimension by driving the Z-axis servo motor 40 to move the processing nozzle 12 in the Z-axis direction away from the workpiece W before the power S supplied from the power storage unit 38 is used up. By increasing the gap to a dimension larger than the first dimension 62 for laser processing, the processing nozzle 12 can be prevented in a reliable manner from accidentally hitting the workpiece W. Specifically, according to the laser processing apparatus 70, since the gap sensor 16 is disconnected from the gap control section 18 upon occurrence of a power failure, the gap can be increased irrespective of the detection range or operating condition of the gap sensor 16.

In the above configuration, the nozzle retract command value 72 can be set to a value corresponding to a detection limit value at a proximity side, provided for the gap sensor 16. With this configuration, the difference between the first dimension 62 as the target value and the nozzle retraction command value 72 can be ensured.

The laser processing apparatus 70 is equipped with a position sensor (Z-axis position sensor 44) for detecting the Z-axis position of the processing nozzle 12 relative to the workpiece W. In the laser processing apparatus 70, the gap control section 18 can be configured to refer not only to the detected value P of the Z-axis position sensor 44 indicating the operating position of the Z-axis servo motor 40 but also to a second dimension 76 (stored, e.g., in a memory (not shown) provided in the control apparatus 34) which is previously determined to be larger than the first dimension 62. In that case, when the detected value P of the Z-axis position sensor 44 reaches a value corresponding to the second dimension 76, the gap control section 18 performs control so that the manipulating variable to be output from the manipulating variable calculating section 60 is reduced to zero. According to this configuration, when the Z-axis servo motor 40 is operating to move the processing nozzle 12 in the Z-axis direction away from the workpiece W with the gap control section 18 outputting a constant positive manipulating variable in response to the abnormality detection signal F from the power monitoring section 20, the Z-axis servo motor 40 can be stopped when the gap reaches the second dimension 76, and the gap can thus be maintained at the predetermined second dimension 76. The second dimension 76 can be set to a value larger than the detection range of the gap sensor 16.

Figure 4:
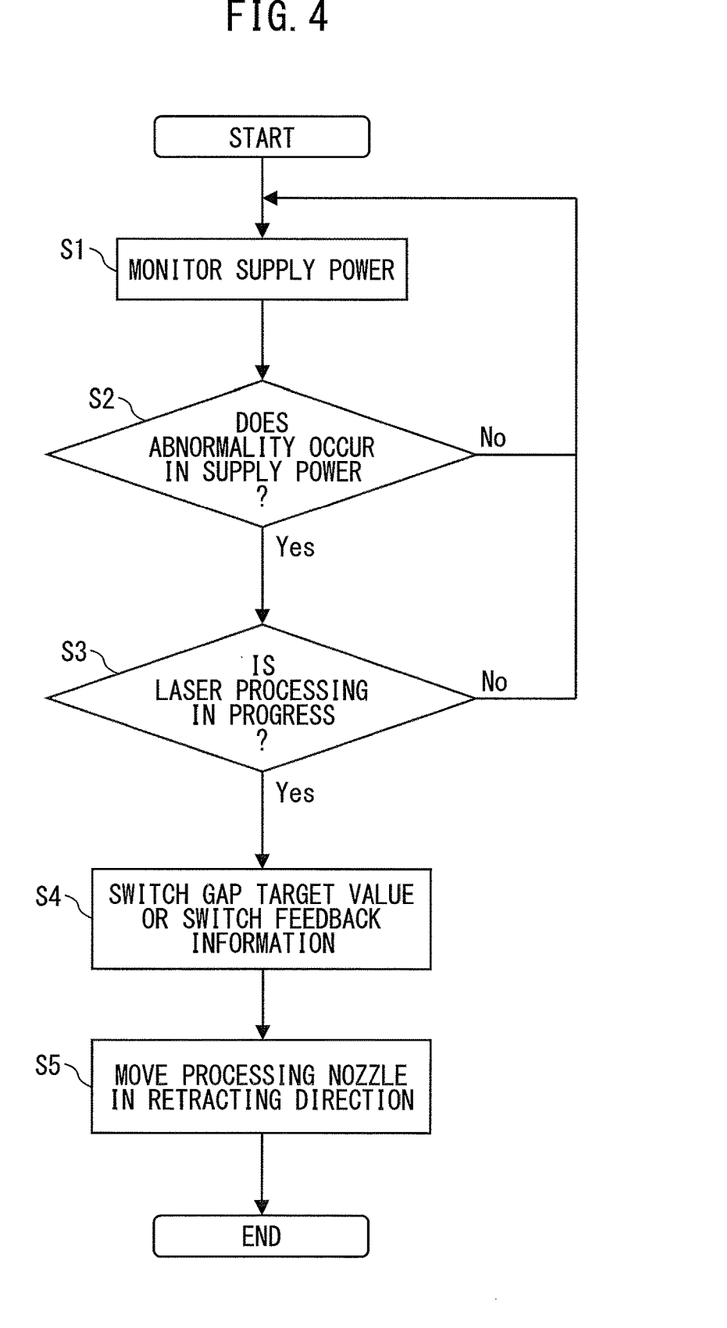
FIG. 4 is an operation control flow for a processing nozzle, which is carried out in the event of a power failure.

FIG. 4 is an operation control flow for the processing nozzle 12, which is carried out by the laser processing apparatus 30 or 70 in the event of a power failure. First, in step S1, the power monitoring section 20 monitors electric power supplied from the power supply unit 36. In step S2, the power monitoring section 20 determines whether an abnormality has occurred in the supply power of the power supply unit 36 and, if no abnormality has occurred, returns to step S1 to continue the monitoring. If it is determined in step S2 that an abnormality has occurred in the supply power, the power monitoring section 20 sends an abnormality detection signal F to the gap control section 18. When the abnormality detection signal F is sent from the power monitoring section 20 to the gap control section 18, the control apparatus 34 determines, in step S3, whether laser processing is in progress in accordance with the processing program. If laser processing is not in progress, the process returns to step S1, and the power monitoring section 20 continues to monitor the power supply unit 36. If it is determined in step S3 that laser processing is in progress, then in step S4 the control action switching section 22 switches the target value for the gap control from the first dimension 62 to the second dimension 64 (FIG. 2), or switches the feedback information for the gap control from the measured value G of the gap sensor 16 to the nozzle retraction command value 72 (FIG. 3). Then, in step S5, the Z-axis servo motor 40 is driven to move the processing nozzle 12 in the retracting direction away from the workpiece W.

While the embodiments of the present invention have been described above, it will be understood by those skilled in the art that various modifications and changes can be made without departing from the scope of the invention as defined by the appended claims.

The invention claimed is:

1. A laser processing apparatus comprising:
  a processing nozzle configured to irradiate a workpiece with laser beam;
  a driving mechanism configured to move said processing nozzle and said workpiece relative to each other;
  a gap sensor configured to detect a gap between said processing nozzle and said workpiece;
  a gap control section configured to refer to a measured value detected by said gap sensor and calculate a manipulating variable used for controlling said driving mechanism so as to maintain said gap during execution of laser processing at a first dimension;
  a power monitoring section configured to monitor electric power supplied from a power supply and send an abnormality detection signal to said gap control section when an abnormality occurs in the electric power; and
  a control action switching section configured to switch a control action of said gap control section so as to increase said gap from said first dimension when said abnormality detection signal is sent to said gap control section during execution of laser processing,
  wherein said control action switching section includes a target value selecting section configured to select, as a target value of said gap, either one of said first dimension that is previously determined and a second dimension that is previously determined to be larger than said first dimension, and wherein,
  when said abnormality detection signal is sent to said gap control section during execution of laser processing, said target value selecting section selects said second dimension instead of said first dimension, and said gap control section calculates a manipulating variable used for controlling said driving mechanism so as to maintain said gap at said second dimension.

* * * * *